(12) United States Patent
Nakao

(10) Patent No.: US 9,615,332 B2
(45) Date of Patent: Apr. 4, 2017

(54) MOBILE TERMINAL DEVICE AND METHOD FOR DEVICE NETWORK SETTING

(71) Applicant: FUJITSU LIMITED, Kawasaki-shi, Kanagawa (JP)

(72) Inventor: Manabu Nakao, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/044,277

(22) Filed: Feb. 16, 2016

(65) Prior Publication Data

US 2016/0249295 A1 Aug. 25, 2016

(30) Foreign Application Priority Data

Feb. 24, 2015 (JP) ................................ 2015-034557

(51) Int. Cl.
*H04W 52/02* (2009.01)
*H04W 4/00* (2009.01)

(52) U.S. Cl.
CPC ....... *H04W 52/0258* (2013.01); *H04W 4/005* (2013.01)

(58) Field of Classification Search
CPC ....... G06K 2017/0045; G06K 7/10356; G08C 17/00; H04L 41/0803; H04L 12/12; H04L 12/5692; H04W 40/08; H04W 88/08; H04W 76/02; H04W 8/005; H04W 52/0258; H04W 4/005
See application file for complete search history.

(56) References Cited

U.S. PATENT DOCUMENTS

| 8,358,364 | B2 * | 1/2013 | Saito | ...................... | G08C 17/00 |
| | | | | | 341/173 |
| 2004/0008633 | A1 * | 1/2004 | Youn | ...................... | H04L 12/12 |
| | | | | | 370/254 |
| 2008/0003946 | A1 * | 1/2008 | Lee | ....................... | H04W 8/005 |
| | | | | | 455/41.2 |
| 2010/0144347 | A1 * | 6/2010 | Yamamoto | ........ | H04W 52/0241 |
| | | | | | 455/434 |
| 2010/0244580 | A1 * | 9/2010 | Uchida | .................... | H02J 5/005 |
| | | | | | 307/104 |
| 2013/0281139 | A1 * | 10/2013 | Wilhelmsson | .... | H04W 52/0245 |
| | | | | | 455/500 |

FOREIGN PATENT DOCUMENTS

| JP | 2005-348203 A | 12/2005 |
| JP | 2013-005294 A | 1/2013 |

* cited by examiner

*Primary Examiner* — Nizar Sivji
(74) *Attorney, Agent, or Firm* — Fujitsu Patent Center

(57) ABSTRACT

A mobile terminal device includes a wireless communication unit that performs wireless communication with another battery-operated device; and a processor connected to the wireless communication unit, wherein the processor executes a process including: calculating power consumption for each of network configurations that differ in a connection relation between a plurality of devices including the mobile terminal device and the another device, the power consumption consumed by the devices for wireless communication, determining a network configuration having a longest battery duration of the devices, based on the calculated power consumption, and setting a connection between the devices according to the determined network configuration.

7 Claims, 17 Drawing Sheets

FIG.3A
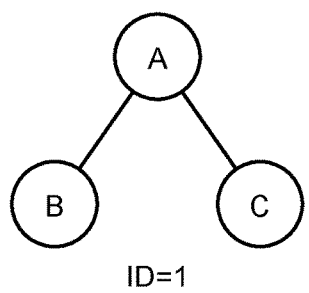
ID=1
FIG.3B
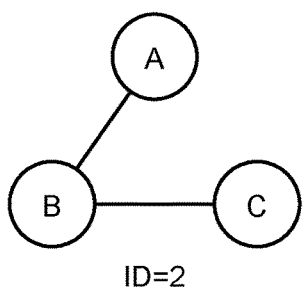
ID=2
FIG.3C
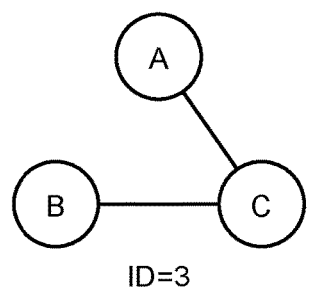
ID=3
FIG.4
| NETWORK CONFIGURATION ID | COMPONENTS |
|---|---|
| 1 | (A, B)(A, C) |
| 2 | (A, B)(B, C) |
| 3 | (A, C)(B, C) |

FIG.5

| SOURCE | DESTINATION | ROUTE (ID=1) | ROUTE (ID=2) | ROUTE (ID=3) |
|---|---|---|---|---|
| A | B | A→B | A→B | A→C→B |
| B | A | B→A | B→A | B→C→A |
| A | C | A→C | A→B→C | A→C |
| C | A | C→A | C→B→A | C→A |
| B | C | B→A→C | B→C | B→C |
| C | B | C→A→B | C→B | C→B |

FIG.6

| SOURCE | DESTINATION | COMMUNICATION TRAFFIC |
|---|---|---|
| A | B | 100 [Bytes/s] |
| B | A | 100 [Bytes/s] |
| A | C | 10 [Bytes/s] |
| C | A | 10 [Bytes/s] |
| B | C | 1000 [Bytes/s] |
| C | B | 1000 [Bytes/s] |

FIG.7

| TYPE | POWER | POWER VALUE |
|---|---|---|
| CONNECTION MAINTENANCE POWER | $P_C(A, B)$ | 0.5 [mW] |
| | $P_C(B, A)$ | 0.5 [mW] |
| | $P_C(A, C)$ | 0.5 [mW] |
| | $P_C(C, A)$ | 0.5 [mW] |
| | $P_C(B, C)$ | 0.5 [mW] |
| | $P_C(C, B)$ | 0.5 [mW] |
| TRANSMISSION POWER | $P_T(A, B)$ | 0.002 [mWs/Bytes] |
| | $P_T(B, A)$ | 0.002 [mWs/Bytes] |
| | $P_T(A, C)$ | 0.002 [mWs/Bytes] |
| | $P_T(C, A)$ | 0.002 [mWs/Bytes] |
| | $P_T(B, C)$ | 0.002 [mWs/Bytes] |
| | $P_T(C, B)$ | 0.002 [mWs/Bytes] |
| RECEPTION POWER | $P_R(A, B)$ | 0.002 [mWs/Bytes] |
| | $P_R(B, A)$ | 0.002 [mWs/Bytes] |
| | $P_R(A, C)$ | 0.002 [mWs/Bytes] |
| | $P_R(C, A)$ | 0.002 [mWs/Bytes] |
| | $P_R(B, C)$ | 0.002 [mWs/Bytes] |
| | $P_R(C, B)$ | 0.002 [mWs/Bytes] |

| DESTINATION | NEXT TRANSMISSION DESTINATION |
|---|---|
| A | B |
| B | B |

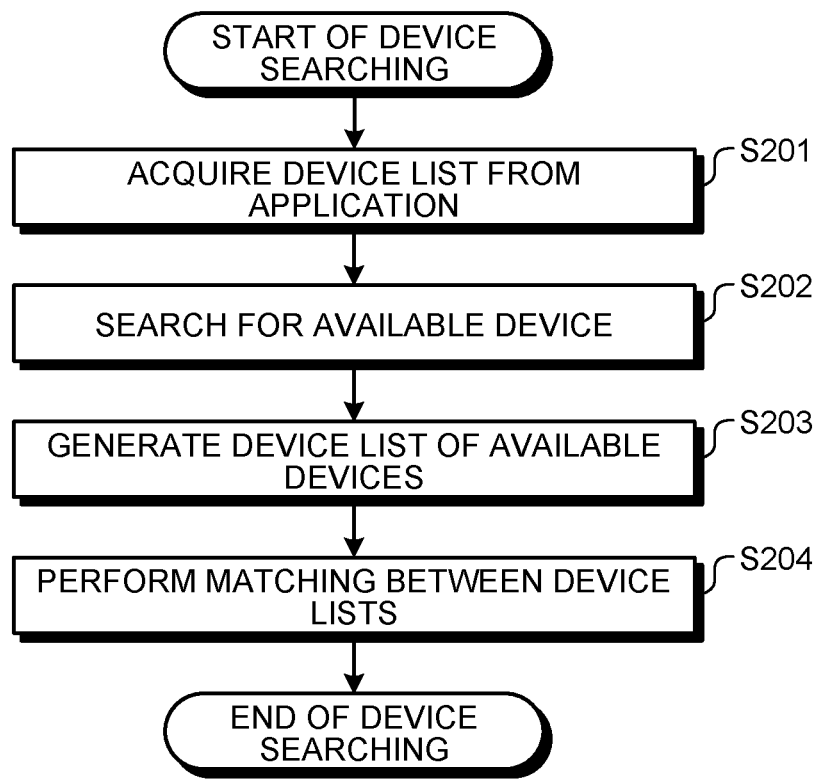

FIG.15

|  | NETWORK CONFIGURATION ID | | |
|---|---|---|---|
|  | 1 | 2 | 3 |
| POWER CONSUMPTION OF DEVICE A | 4.63 [mW] | 1.33 [mW] | 1.33 [mW] |
| POWER CONSUMPTION OF DEVICE B | 3.40 [mW] | 3.46 [mW] | 3.40 [mW] |
| POWER CONSUMPTION OF DEVICE C | 2.23 [mW] | 2.23 [mW] | 2.83 [mW] |

FIG.16

|  | NETWORK CONFIGURATION ID | | |
|---|---|---|---|
|  | 1 | 2 | 3 |
| DURATION OF DEVICE A | 2.16 [h] | 7.52 [h] | 7.52 [h] |
| DURATION OF DEVICE B | 2.94 [h] | 2.89 [h] | 2.94 [h] |
| DURATION OF DEVICE C | 4.48 [h] | 4.48 [h] | 3.53 [h] |

FIG.17

|  | NETWORK CONFIGURATION ID | | |
|---|---|---|---|
|  | 1 | 2 | 3 |
| DURATION OF DEVICE A | 2.16 [h] | 7.52 [h] | 7.52 [h] |
| DURATION OF DEVICE B | 2.94 [h] | 2.89 [h] | 2.94 [h] |
| DURATION OF DEVICE C | 3.14 [h] | 3.14 [h] | 2.47 [h] |

FIG.18

| TYPE | POWER | POWER VALUE |
|---|---|---|
| CONNECTION MAINTENANCE POWER | $P_C(A, B)$ | 0.5 [mW] |
| | $P_C(B, A)$ | 0.5 [mW] |
| | $P_C(A, C)$ | 0.5 [mW] |
| | $P_C(C, A)$ | 0.5 [mW] |
| | $P_C(B, C)$ | 0.5 [mW] |
| | $P_C(C, B)$ | 0.5 [mW] |
| TRANSMISSION POWER | $P_T(A, B)$ | 0.002 [mWs/Bytes] |
| | $P_T(B, A)$ | 0.002 [mWs/Bytes] |
| | $P_T(A, C)$ | 0.002 [mWs/Bytes] |
| | $P_T(C, A)$ | 0.002 [mWs/Bytes] |
| | $P_T(B, C)$ | 0.002 [mWs/Bytes] |
| | $P_T(C, B)$ | 0.002 [mWs/Bytes] |
| RECEPTION POWER | $P_R(A, B)$ | 0.002 [mWs/Bytes] |
| | $P_R(B, A)$ | 0.002 [mWs/Bytes] |
| | $P_R(A, C)$ | 0.002 [mWs/Bytes] |
| | $P_R(C, A)$ | 0.002 [mWs/Bytes] |
| | $P_R(B, C)$ | 0.002 [mWs/Bytes] |
| | $P_R(C, B)$ | 0.002 [mWs/Bytes] |
| PROCESSING POWER | $P_P(A)$ | 10 [mW] |
| | $P_P(B)$ | 2 [mW] |
| | $P_P(C)$ | 3 [mW] |

FIG.20

| DEVICE | FUNCTION | PROCESSING POWER |
|---|---|---|
| B | X (DETERMINATION BY SENSOR) | 1 [mW] |
| | Y (DETERMINATION OF OUTPUT) | 1 [mW] |
| C | Z (DISPLAY) | 2 [mW] |
| | Y (DETERMINATION OF OUTPUT) | 0.5 [mW] |

FIG.21

| PATTERN ID | NETWORK CONFIGURATION ID | COMPONENTS | FUNCTION ALLOCATION |
|---|---|---|---|
| 1 | 1 | (A, B)(A, C) | FUNCTIONS X, Y: B<br>FUNCTIONS Z: C |
| 2 | 2 | (A, B)(B, C) | FUNCTIONS X, Y: B<br>FUNCTIONS Z: C |
| 3 | 3 | (A, C)(B, C) | FUNCTIONS X, Y: B<br>FUNCTIONS Z: C |
| 4 | 1 | (A, B)(A, C) | FUNCTIONS X: B<br>FUNCTIONS Y, Z: C |
| 5 | 2 | (A, B)(B, C) | FUNCTIONS X: B<br>FUNCTIONS Y, Z: C |
| 6 | 3 | (A, C)(B, C) | FUNCTIONS X: B<br>FUNCTIONS Y, Z: C |

FIG.22

| FUNCTION ALLOCATION | SOURCE | DESTINATION | COMMUNICATION TRAFFIC |
|---|---|---|---|
| FUNCTIONS X, Y: B<br>FUNCTIONS Z: C | A | B | 100 [Bytes/s] |
| | B | A | 100 [Bytes/s] |
| | A | C | 10 [Bytes/s] |
| | C | A | 10 [Bytes/s] |
| | B | C | 100 [Bytes/s] |
| | C | B | 100 [Bytes/s] |
| FUNCTIONS X: B<br>FUNCTIONS Y, Z: C | A | B | 100 [Bytes/s] |
| | B | A | 100 [Bytes/s] |
| | A | C | 10 [Bytes/s] |
| | C | A | 10 [Bytes/s] |
| | B | C | 1000 [Bytes/s] |
| | C | B | 100 [Bytes/s] |

MOBILE TERMINAL DEVICE AND METHOD FOR DEVICE NETWORK SETTING

CROSS-REFERENCE TO RELATED APPLICATION

This application is based upon and claims the benefit of priority of the prior Japanese Patent Application No. 2015-034557, filed on Feb. 24, 2015, the entire contents of which are incorporated herein by reference.

FIELD

The embodiments discussed herein are related to a mobile terminal device and a method for device network setting.

BACKGROUND

Recently, a wearable device that can be worn on a user's body is increasing with improvement in computer performance, miniaturization of devices, and speed-up of communications. Specifically, once the user wears, for example, a wearable device with a sensor, the wearable device always senses pulses, walking conditions, and the like of the user, and can provide the status of the user to, for example, a smartphone owned by the user. Moreover, once the user wears, for example, an eyeglass-type wearable device with a display, the wearable device can display information provided from, for example, a smartphone so that the user easily visually recognizes the information.

By utilizing such wearable devices, it is expected to support operations in various fields. For example, in an inspection operation of devices, when the user stops in front of an inspection target device, even a user not skilled in the operation can efficiently carry out the working if inspection contents are displayed on the eyeglass-type wearable device. The support of these operations can be implemented by a device network system having, for example, a sensor device with a sensor, a display device with a display, and a mobile terminal such as a smartphone.

Specifically, the sensor device detects a status change, as a sensor event, such that the user starts walking and stops walking, and transmits the detected sensor event to the mobile terminal. The mobile terminal generates information corresponding to the sensor event received from the sensor device through processing according to an application in execution, and transmits the generated information to the display device. Then, the display device displays the information received from the mobile terminal.

Patent Literature 1: Japanese Laid-open Patent Publication No. 2013-5294

Patent Literature 2: Japanese Laid-open Patent Publication No. 2005-348203

However, in the device network system, the power consumption of the devices such as the sensor device, the display device, and the mobile terminal is not considered, and therefore, there is a problem that it is difficult to make an operating time sufficiently long. In other words, in the device network system, the mobile terminal operates an application to generate information and transmits the information to the display device each time a sensor event is received from the sensor device. Therefore, the mobile terminal consumes power each time the sensor event is received from the sensor device, and the operating time of the device network system is restricted by the battery capacity of the mobile terminal.

Therefore, it is also considered that the sensor device and the display device directly communicate with each other without passing through the mobile terminal. In this case, it may be configured that the mobile terminal previously performs initial settings for communication and display on the sensor device and the display device and that the sensor device and the display device directly communicate with each other to operate after the initial settings. Consequently, after the initial settings, it is possible to implement the support of operations for the user using the sensor device and the display device even if the mobile terminal does not operate.

However, because there are various devices and applications used for the device network system, the network configuration, in which the sensor device and the display device directly communicate with each other without the mobile terminal, is not always optimal. Moreover, battery capacities and remaining battery capacities of the devices are not always the same as each other, so that an optimal network configuration may be changed depending on the battery capacities and the remaining battery capacities of the devices. Therefore, it is not easy to make sufficiently long the operating time of the device network system in which various devices and applications are used.

SUMMARY

According to an aspect of an embodiment, a mobile terminal device includes a wireless communication unit that performs wireless communication with another battery-operated device; and a processor connected to the wireless communication unit. The processor executes a process including: calculating power consumption for each of network configurations that differ in a connection relation between a plurality of devices including the mobile terminal device and the another device, the power consumption consumed by the devices for wireless communication, determining a network configuration having a longest battery duration of the devices, based on the calculated power consumption, and setting a connection between the devices according to the determined network configuration.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A to 3C are diagrams of specific examples of a network configuration;

FIG. 4 is a diagram of a specific example of a network configuration table according to the first embodiment;

FIG. 5 is a diagram of a specific example of a route information table according to the first embodiment;

FIG. 6 is a diagram of a specific example of a communication frequency table according to the first embodiment;

FIG. 7 is a diagram of a specific example of a power information table according to the first embodiment;

FIG. 12 is a flowchart of device searching processing;

FIG. 13 is a diagram of a specific example of a device list;

FIG. 15 is a diagram of a specific example of power consumption of each device;

FIG. 16 is a diagram of a specific example of a battery duration of each device;

FIG. 17 is a diagram of another specific example of the battery duration of each device;

FIG. 18 is a diagram of a specific example of a power information table according to a second embodiment;

FIG. 20 is a diagram of a specific example of a function information table according to the third embodiment;

FIG. 21 is a diagram of a specific example of an allocation pattern table according to the third embodiment;

FIG. 22 is a diagram of a specific example of a communication frequency table according to the third embodiment.

DESCRIPTION OF EMBODIMENTS

Preferred embodiments of the present invention will be explained with reference to accompanying drawings. It is noted that the present invention is not limited by the embodiments.

[a] First Embodiment

Figure 1:
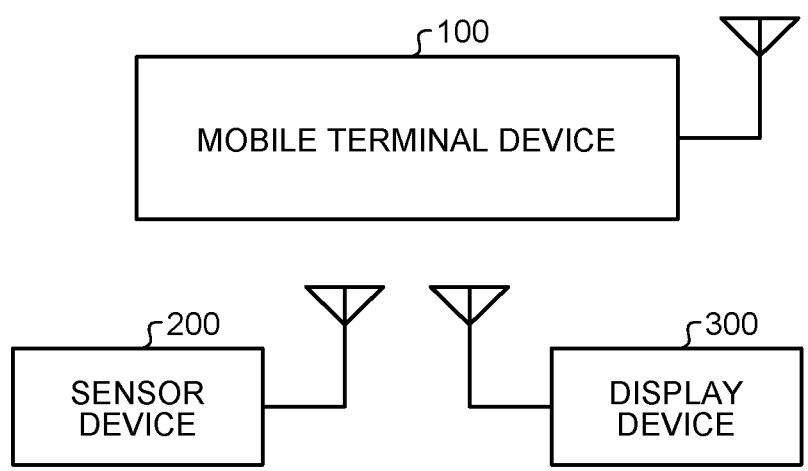
FIG. 1 is a diagram of a configuration of a device network system according to a first embodiment.

FIG. 1 is a diagram of a configuration of a device network system according to a first embodiment. The device network system illustrated in FIG. 1 includes a mobile terminal device 100, a sensor device 200, and a display device 300. In the present specification, the device network system including the mobile terminal device, the sensor device, and the display device is exemplified; however, the configuration of the device network system is not limited thereto. Therefore, various devices other than the sensor device and the display device may be included in the device network system. In the present specification, the device such as the mobile terminal device, the sensor device, and the display device may also be called simply "device".

The mobile terminal device 100 is an information processing terminal such as a smartphone, and includes a wireless interface (hereinafter, "wireless I/F") capable of performing wireless communication with the sensor device 200 and the display device 300.

The mobile terminal device 100 executes an application for providing services using the sensor device 200 and the display device 300, and determines an optimal network configuration according to the application. That is, the mobile terminal device 100 determines a network configuration that allows each device to operate the longest, based on a remaining battery capacity of each of devices including its own device and based on power consumption due to communication between the devices occurring according to the processing of the application. The mobile terminal device 100 generates routing information for each device in order to form the determined network configuration, and performs communication settings of each device.

The sensor device 200 includes a sensor such as an acceleration sensor and a temperature sensor, and a wireless I/F capable of performing wireless communication with the mobile terminal device 100 and the display device 300. The sensor device 200 may be, for example, a wristwatch type wearable device that can be worn on a user's arm. The sensor device 200 transmits a sensor event detected by the sensor to the mobile terminal device 100 or to the display device 300 through the wireless I/F. At this time, the sensor device 200 transmits the sensor event according to the routing information generated by the mobile terminal device 100.

The display device 300 includes, for example, a display and a wireless I/F capable of performing wireless communication with the mobile terminal device 100 and the sensor device 200. The display device 300 may be, for example, an eyeglass type wearable device that can be worn on a user's head. The display device 300 displays display information according to the application during execution in the mobile terminal device 100. At this time, the display device 300 receives the display information from the mobile terminal device 100 or from the sensor device 200 according to the routing information generated by the mobile terminal device 100.

As the wireless I/F provided in each device, an interface based on a communication standard such as Bluetooth® can be used.

Figure 2:
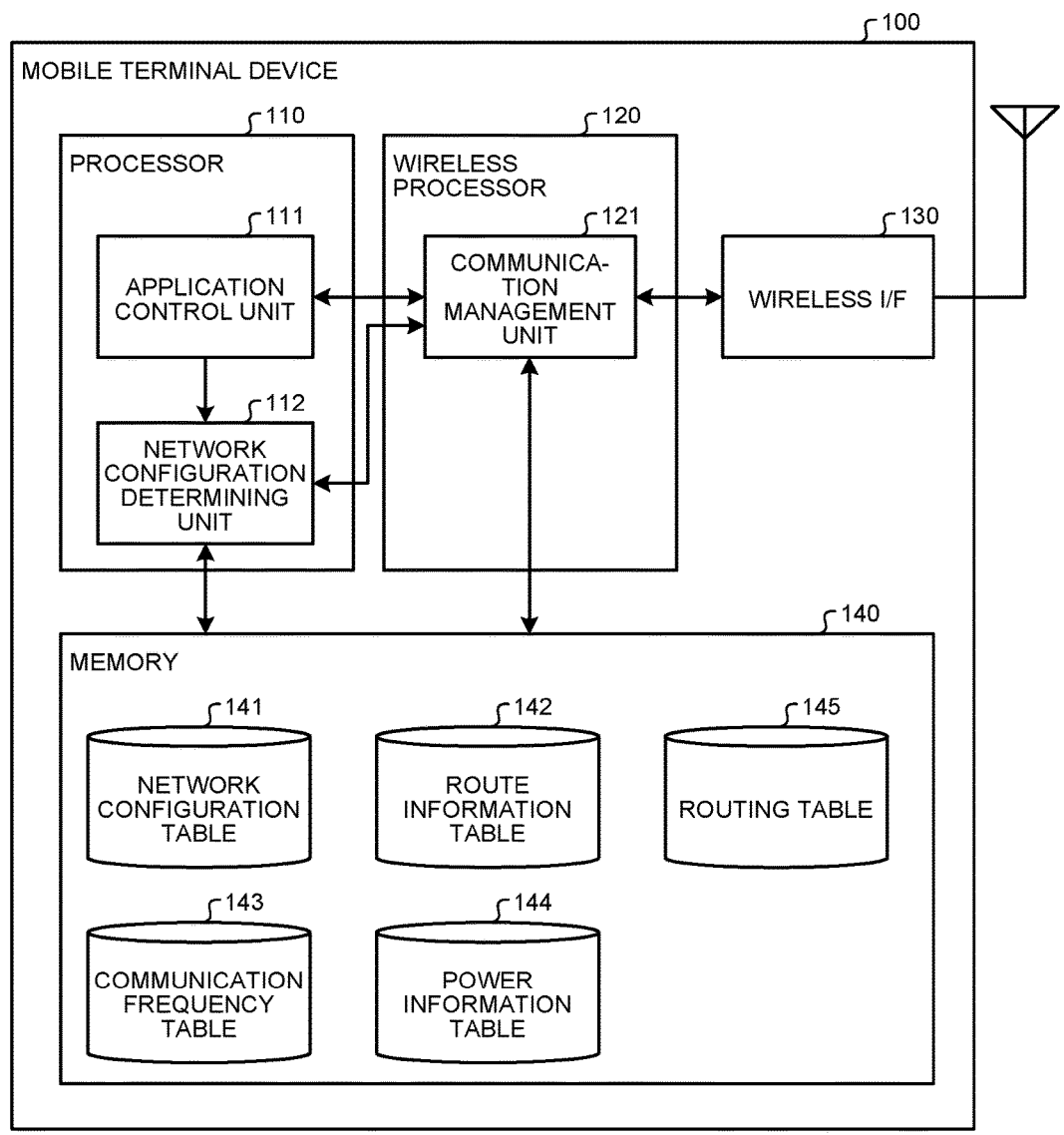
FIG. 2 is a block diagram of a configuration of a mobile terminal device according to the first embodiment.

FIG. 2 is a block diagram of a configuration of the mobile terminal device 100 according to the first embodiment. The mobile terminal device 100 illustrated in FIG. 2 includes a processor 110, a wireless processor 120, a wireless I/F 130, and a memory 140.

The processor 110 includes, for example, a central processing unit (CPU), a microprocessor unit (MPU), or a digital signal processor (DSP), and integrally controls the mobile terminal device 100. Specifically, the processor 110 includes an application control unit 111 and a network configuration determining unit 112.

The application control unit 111 executes an application for providing services using devices such as the sensor device 200 and the display device 300. The application control unit 111 outputs a list of the devices used when the application is executed to provide services to the network configuration determining unit 112. The application control unit 111 directs the operations of the sensor device 200 and the display device 300 according to the application to be executed.

When the device list is output from the application control unit 111, the network configuration determining unit 112 determines whether wireless communication is possible with all the devices included in the device list. When wireless communication is possible with all the devices included in the device list, the network configuration determining unit 112 calculates power consumption due to communication between devices for each of network configurations that differ in a connection relation between devices. The network configuration determining unit 112 determines an optimal network configuration capable of maximizing the operating time of each device based on the calculated power consumption for each network configuration. The network configuration determining unit 112 then generates routing information for each device in order to form the determined network configuration, and performs communication settings of each device.

The wireless processor 120 includes, for example, CPU, MPU, or DSP, and controls wireless communication through the wireless I/F 130. Specifically, the wireless processor 120 includes a communication management unit 121.

The communication management unit 121 receives an instruction from the network configuration determining unit 112, and searches for a device capable of wireless communication with the mobile terminal device 100 through the wireless I/F 130. The communication management unit 121 generates a list of devices capable of wireless communication with the mobile terminal device 100 and outputs the list to the network configuration determining unit 112. The communication management unit 121 transmits the routing information for each device generated by the network configuration determining unit 112 to the sensor device 200 and the display device 300 through the wireless I/F 130. Moreover, the communication management unit 121 transmits/receives various pieces of information to/from the sensor device 200 and the display device 300 according to the processing of the application executed by the application control unit 111. At this time, the communication management unit 121 refers to the memory 140 to perform transmission and reception of the information along the route according to the routing information of the mobile terminal device 100.

The wireless I/F 130 is an interface based on the communication standard such as Bluetooth®, and performs wireless communication with the sensor device 200 and the display device 300 according to the control performed by the communication management unit 121.

The memory 140 is a storage unit including, for example, a random access memory (RAM), and stores information used for processing executed by the processor 110 and the wireless processor 120. Specifically, the memory 140 stores a network configuration table 141, a route information table 142, a communication frequency table 143, a power information table 144, and a routing table 145.

The tables stored in the memory 140 will be explained below using specific examples. Hereinafter, the device network system is assumed to have three devices, a device A, a device B, and a device C. In such a device network system, three types of network configurations are possible as illustrated in FIGS. 3A to 3C.

In other words, in the network configuration illustrated in FIG. 3A, the device A and the device B are directly connected to each other, and the device A and the device C are directly connected to each other. Likewise, in the network configuration illustrated in FIG. 3B, the device A and the device B are directly connected to each other, and the device B and the device C are directly connected to each other. In the network configuration illustrated in FIG. 3C, the device A and the device C are directly connected to each other, and the device B and the device C are directly connected to each other. In addition, for example, network configurations in which all the devices A to C are mutually and directly connected to each other are possible; however, for the sake of simple explanation, the three types of network configurations will be studied herein. Pieces of identification information can be respectively added to these network configurations.

The network configuration table 141 stores a plurality of network configurations that can be formed with devices which the communication management unit 121 searches for and determines that the devices are capable of wireless communication. That is, the network configuration table 141 stores a combination of directly connected devices in a network configuration associated with the identification information of the network configuration.

Specifically, FIG. 4 represents an example of the network configuration table 141 when the network configurations illustrated in FIGS. 3A to 3C are possible. As illustrated in FIG. 4, the network configuration table 141 stores a combination of directly connected devices, as a component, in association with a network configuration ID being the identification information of the network configuration. In other words, for example, it is learned, from the network configuration whose network configuration ID is 1, that the device A and the device B are directly connected to each other and the device A and the device C are directly connected to each other, which corresponds to the network configuration illustrated in FIG. 3A.

The network configuration table 141 only has to be generated by the network configuration determining unit 112 enumerating possible connection relations between devices based on the device list, capable of wireless communication, output from the communication management unit 121.

The route information table 142 stores routes for each network configuration about each of combinations between a source and a destination of information. That is, the route information table 142 stores communication routes for each network configuration about all the combinations of two devices when one of the devices is set as a source of information and the other is set as a final destination of the information.

Specifically, FIG. 5 represents an example of the route information table 142 when the network configurations illustrated in FIGS. 3A to 3C are possible. As illustrated in FIG. 5, the route information table 142 stores communication routes for each network configuration, each of which is associated with a combination between a source device and a destination device. In other words, focusing on a combination in which, for example, the source is the device A and the destination is the device B, in the network configurations whose network configuration IDs are 1 and 2, information is directly transmitted from the device A to the device B. On the other hand, in the network configuration whose network configuration ID is 3, it is learned that information is transmitted from the device A to the device B through the device C. This indicates that the network configuration whose network configuration ID is 3 (FIG. 3O) reflects that the information transmitted from the device A to the device B is through the device C because the device A and the device B are not directly connected to each other.

The route information table 142 only has to be generated, after generation of the network configuration table 141, by the network configuration determining unit 112 enumerating communication routes, for each network configuration, in which all the combinations of the two devices are set as sources and destinations.

The communication frequency table 143 stores communication traffic between devices occurring due to the processing of an application. That is, the communication frequency table 143 stores a source, a destination, and a communication traffic of information transmitted and received between devices according to the processing of the application executed by the application control unit 111.

Specifically, FIG. 6 represents an example of the communication frequency table 143 when the network configurations illustrated in FIGS. 3A to 3C are possible. As illustrated in FIG. 6, the communication frequency table 143 stores a communication traffic per unit time associated with a source and a destination of communication generated according to the processing of an application. In other words, for example, in the communication in which the source is the device A and the destination is the device B, it is known that 100 bytes per second are generated. Because the source of the communication frequency table 143 is a source as a starting point of communication and the destination thereof is a destination as an end point of the communication, the communication traffic stored by the communication frequency table 143 does not include a communication traffic when each of the devices functions as a relay point for relaying information.

The communication frequency table 143 only has to be generated by the network configuration determining unit 112 that acquires an assumed communication traffic between devices due to the processing of an application from the application control unit 111 and associates source and destination devices with the communication traffic.

The power information table 144 stores power consumption due to communication between devices. That is, the power information table 144 stores, about all combinations of two devices, connection maintenance power consumed to maintain the connection, transmission power consumed by a device that transmits information, and reception power consumed by a device that receives information.

Specifically, FIG. 7 represents an example of the power information table 144 when the network configurations illustrated in FIGS. 3A to 3C are possible. As illustrated in FIG. 7, the power information table 144 stores three types of power consumptions such as the connection maintenance power, the transmission power, and the reception power for each combination of two devices. In other words, for example, a power consumption $P_C(A, B)$ of the device A, for which the device A maintains a connection with the device B, is 0.5 mW (milliwatt). For example, a power consumption $P_T(A, B)$ of the device A, for which the device A transmits information to the device B, is 0.002 mWs (milliwatt second) per one byte. Likewise, for example, a power consumption $P_R(A, B)$ of the device A, for which the device A receives information from the device B, is 0.002 mWs (milliwatt second) per one byte.

The power information table 144 only has to store power consumption beforehand based on the specifications and the communication standard of each device. Moreover, the power information table 144 only has to be generated from collected monitoring results obtained by the mobile terminal device 100 that collects the results of monitoring power consumption of each device.

The routing table 145 stores a transmission destination when the mobile terminal device 100 transmits information in the network configuration determined, as optimal, by the network configuration determining unit 112. That is, the routing table 145 stores a next transmission destination, to which the mobile terminal device 100 is to transmit information, in association with a final destination of the information.

Figures 8, 9:
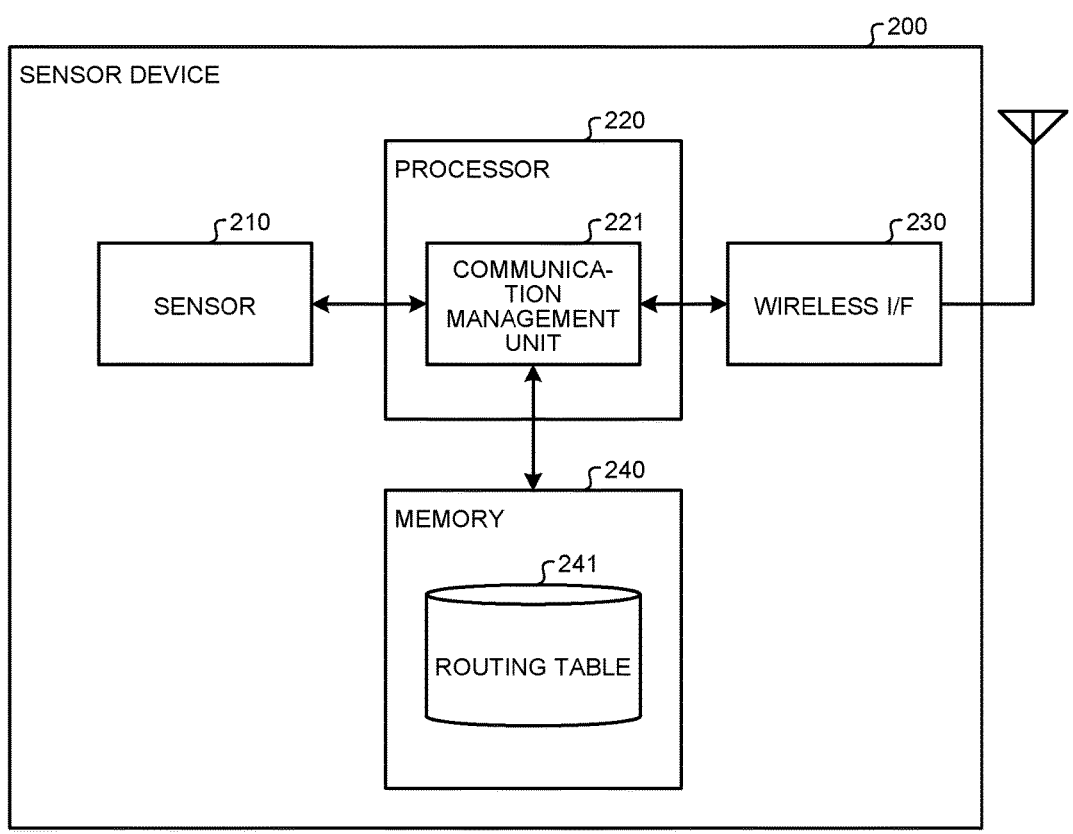
FIG. 8 is a diagram of a specific example of a routing table according to the first embodiment.
FIG. 9 is a block diagram of a configuration of a sensor device according to the first embodiment.

Specifically, FIG. 8 represents an example of the routing table 145 in the device C when it is determined that the network configuration illustrated in FIG. 3B is optimal. As illustrated in FIG. 8, even when the final destination of the information is both the device A and the device B, the next transmission destination of the information is the device B. This indicates that the network configuration illustrated in FIG. 3B reflects that the information transmitted from the device C to the device A is through the device B.

The routing table 145 is stored in the memory 140 by the network configuration determining unit 112 that generates routing information for each device in an optimal network configuration after the optimal network configuration is determined. That is, the routing table 145 to be stored in the memory 140 is the routing table of the mobile terminal device 100 corresponding to the optimal network configuration. Therefore, the network configuration determining unit 112 separately generates routing tables of the sensor device 200 and the display device 300, and notifies the sensor device 200 and the display device 300 of these routing tables.

The network configuration determining unit 112 refers to the network configuration table 141, the route information table 142, the communication frequency table 143, and the power information table 144 to calculate power consumption due to communication for each network configuration. The network configuration determining unit 112 then calculates a battery duration of each device for each network configuration from the remaining battery capacities of the mobile terminal device 100, the sensor device 200, and the display device 300 and from the calculated power consumption. Moreover, the network configuration determining unit 112 compares minimum values of the battery durations of the devices in each network configuration, and determines a network configuration whose minimum value is the maximum as an optimal network configuration. The network configuration determining unit 112 generates the routing table 145 of the mobile terminal device 100 and respective routing tables of the sensor device 200 and the display device 300 for forming the optimal network configuration.

Configurations of the sensor device 200 and the display device 300 will be explained next with reference to FIG. 9 and FIG. 10. FIG. 9 is a block diagram of the configuration of the sensor device 200. The sensor device 200 illustrated in FIG. 9 includes a sensor 210, a processor 220, a wireless I/F 230, and a memory 240.

The sensor 210 measures parameters, for example, acceleration and temperature, and outputs the measured values to the processor 220. The sensor 210 may be a sensor for measuring various parameters such as geomagnetism, angular velocity, and user's pulse other than the acceleration and the temperature.

The processor 220 includes, for example, CPU, MPU, or DSP, and integrally controls the sensor device 200. Specifically, the processor 220 includes a communication management unit 221.

The communication management unit 221 performs determination directed from the application executed by the mobile terminal device 100 on the measured value output from the sensor 210. The communication management unit 221 then transmits the sensor event according to the result of determination to the mobile terminal device 100 or to the display device 300 through the wireless I/F 230. At this time, the communication management unit 221 refers to the memory 240, and transmits the sensor event according to the routing information corresponding to the optimal network configuration. Moreover, the communication management unit 221 receives the routing information corresponding to the optimal network configuration from the mobile terminal device 100 through the wireless I/F 230 to be stored in the memory 240.

The wireless I/F 230 is an interface based on the communication standard such as Bluetooth®, and performs wireless communication with the mobile terminal device 100 and with the display device 300 according to the control performed by the communication management unit 221.

The memory 240 is a storage unit including, for example, a random access memory (RAM), and stores information used for the processing executed by the processor 220. Specifically, the memory 240 stores a routing table 241. The routing table 241 is routing information for the sensor device 200 corresponding to the optimal network configuration determined by the mobile terminal device 100. In other words, similarly to the routing table 145 of the mobile terminal device 100, the routing table 241 stores a next transmission destination, to which the sensor device 200 is to transmit information, in association with a final destination of the information. The routing table 241 is transmitted from the mobile terminal device 100 after the optimal network configuration is determined, and is received by the wireless I/F 230.

Figure 10:
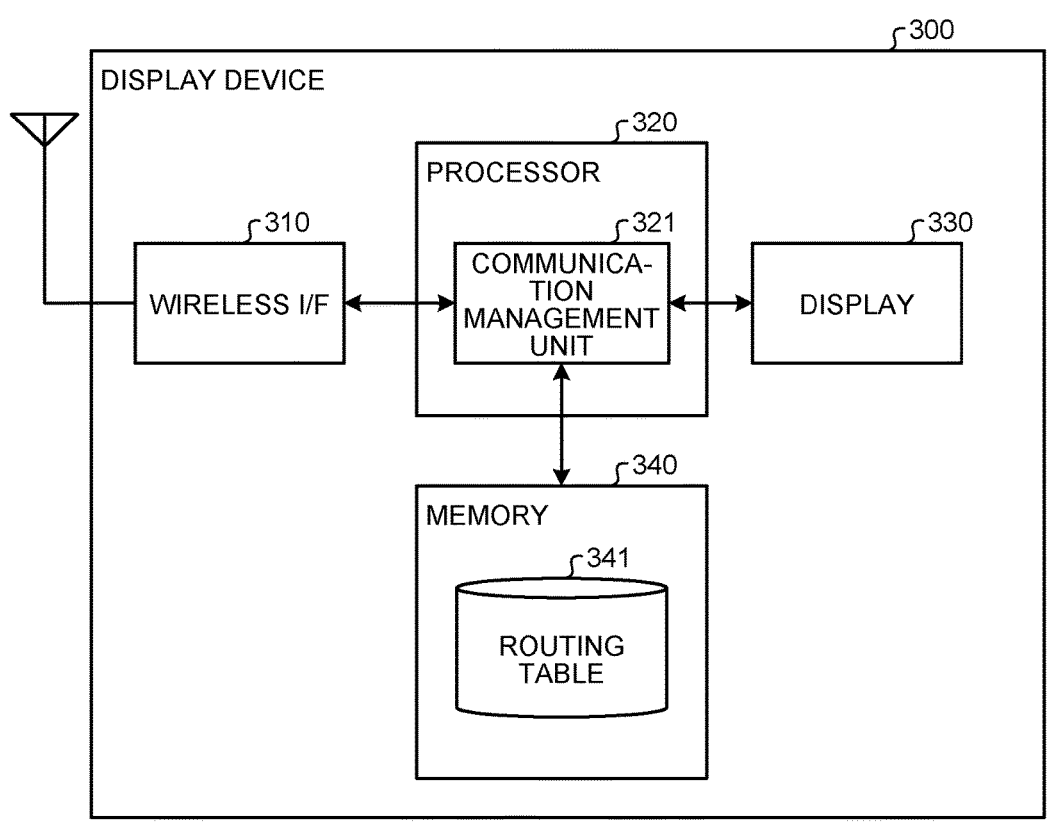
FIG. 10 is a block diagram of a configuration of a display device according to the first embodiment.

FIG. 10 is a block diagram of the configuration of the display device 300. The display device 300 illustrated in FIG. 10 includes a wireless I/F 310, a processor 320, a display 330, and a memory 340.

The wireless I/F 310 is an interface based on the communication standard such as Bluetooth®, and performs wireless communication with the mobile terminal device 100 and with the sensor device 200 according to the control performed by the processor 320.

The processor 320 includes, for example, CPU, MPU, or DSP, and integrally controls the display device 300. Specifically, the processor 320 includes a communication management unit 321.

The communication management unit 321 receives information such as a sensor event transmitted from, for example, the sensor device 200 through the wireless I/F 310. At this time, the communication management unit 321 refers to the memory 340, and receives information according to the routing information corresponding to the optimal network configuration. The communication management unit 321 then generates display information from the received information according to an instruction from the application executed in the mobile terminal device 100, and displays the generated display information on the display 330. Moreover, the communication management unit 321 receives the routing information corresponding to the optimal network configuration from the mobile terminal device 100 through the wireless I/F 310 to be stored in the memory 340.

The display 330 includes, for example, a liquid crystal panel, and displays the display information generated by the communication management unit 321.

The memory 340 is a storage unit including, for example, RAM, and stores information used for processing executed by the processor 320. Specifically, the memory 340 stores a routing table 341. The routing table 341 is routing information for the display device 300 corresponding to the optimal network configuration determined by the mobile terminal device 100. In other words, similarly to the routing table 145 of the mobile terminal device 100, the routing table 341 stores a next transmission destination, to which the display device 300 is to transmit information, in association with a final destination of the information. The routing table 341 is transmitted from the mobile terminal device 100 after the optimal network configuration is determined, and is received by the wireless I/F 310.

Figure 11:
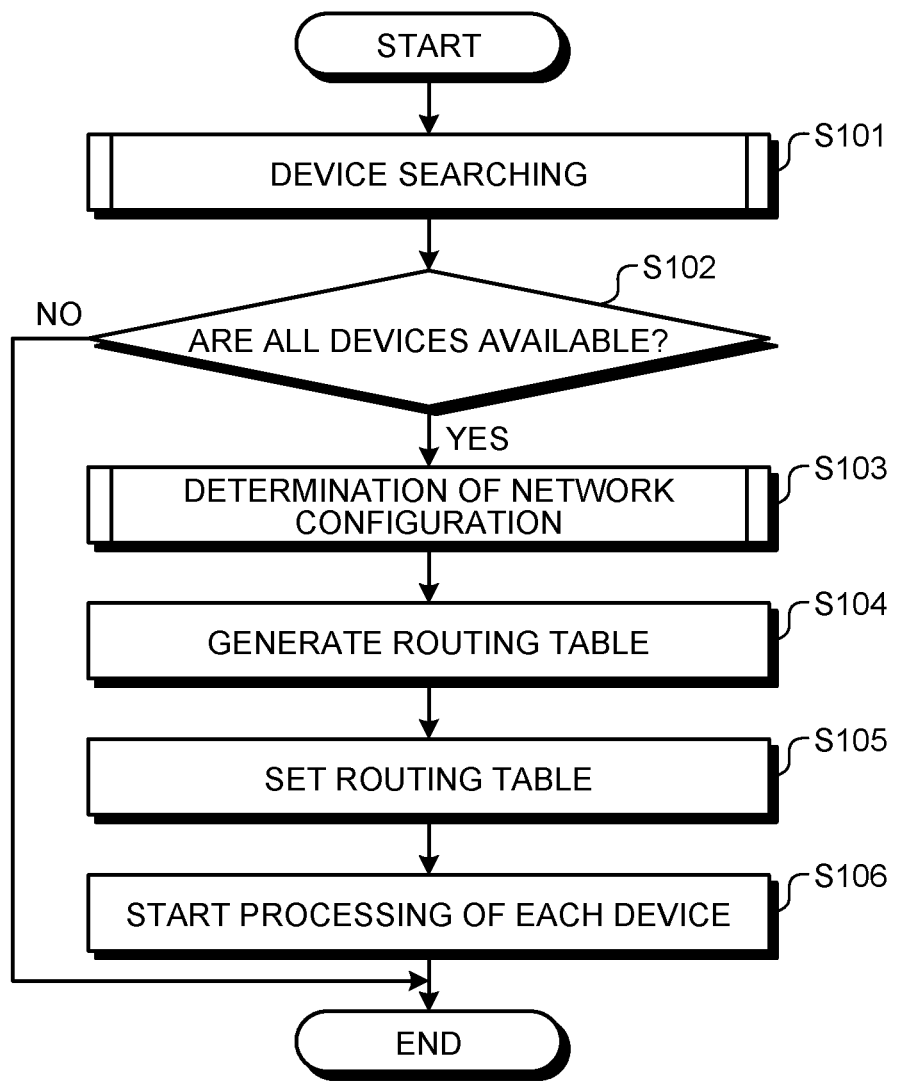
FIG. 11 is a flowchart of device network setting processing according to the first embodiment.

Device network setting processing in the device network system configured in the above manner will be explained next with reference to a flowchart illustrated in FIG. 11. The following device network setting processing is executed mainly by the mobile terminal device 100.

When executing an application, the application control unit 111 of the mobile terminal device 100 notifies the network configuration determining unit 112 of a device to be used for the processing of the application. In this case, the sensor device 200 and the display device 300 are assumed to be used. When receiving the notification, the network configuration determining unit 112 performs a search for any device capable of wireless communication with the mobile terminal device 100 (Step S101).

Then, the network configuration determining unit 112 determines whether all the devices to be used for the processing of the application are capable of wireless communication with the mobile terminal device 100 and are available (Step S102). When it is determined that there is a device that is not available (No at Step S102), the processing of the application is ended. Meanwhile, when both of the sensor device 200 and the display device 300 are available (Yes at Step S102), the network configuration determining unit 112 determines an optimal network configuration whose operating time is the maximum (Step S103).

In other words, the network configuration determining unit 112 refers to the network configuration table 141, the route information table 142, the communication frequency table 143, and the power information table 144 to calculate power consumption due to communication for each network configuration. The network configuration determining unit 112 then calculates a battery duration of each device in each network configuration from the remaining battery capacities of the mobile terminal device 100, the sensor device 200, and the display device 300 and from the calculated power consumption. Moreover, the network configuration determining unit 112 compares minimum values of the battery duration between devices in each network configuration, and determines a network configuration whose minimum value is the maximum as an optimal network configuration. The determination of the optimal network configuration performed by the network configuration determining unit 112 will be explained later.

After the determination of the optimal network configuration, the network configuration determining unit 112 generates a routing table corresponding to this network configuration (Step S104). In other words, the network configuration determining unit 112 generates the routing table 145 of the mobile terminal device 100, the routing table 241 of the sensor device 200, and the routing table 341 of the display device 300. The routing table 145 is then stored in the memory 140.

The routing table 241 and the routing table 341 are transmitted to the sensor device 200 and the display device 300, respectively, through the wireless I/F 130. Then, the routing table 241 is stored in the memory 240 of the sensor device 200 and the routing table 341 is stored in the memory 340, and the settings of the routing tables in the devices are thereby completed (Step S105).

After the completion of settings of the routing tables, each of the mobile terminal device 100, the sensor device 200, and the display device 300 starts the processing according to the application while performing communication based on each corresponding routing table (Step S106). In other words, for example, the sensor device 200 causes the sensor 210 to start measuring the parameter, and the display device 300 starts display of the display information onto the display 330.

The device searching at Step S101 will be explained below with reference to a flowchart illustrated in FIG. 12.

When the application is performed by the application control unit 111, the network configuration determining unit 112 acquires the list of devices to be used for the processing of the application (Step S201). The device list includes identification information of the devices to be used by the application, among pieces of identification information for the devices which are paired with the mobile terminal device 100 in advance. The network configuration determining unit 112 temporarily stores the device list acquired from the application.

The communication management unit 121 is capable of wireless communication with the mobile terminal device 100 by being instructed from the network configuration determining unit 112 through the wireless I/F 130, and performs a search of an available device (Step S202). When searching for the device, the communication management unit 121 transmits a signal to instruct a report of a remaining battery capacity of each device from the wireless I/F 130. When the available device and the remaining battery capacity are found as a result of device searching, the communication management unit 121 generates a list of available devices (Step S203). The device list is, for example, a list as illustrated in FIG. 13, in which a device name as identification information of an available device and a remaining battery capacity are associated with each other. In other words, in the example of FIG. 13, for example, it is learned that the remaining battery capacity of the available device A is 10 mWh (milliwatt hour).

When the communication management unit 121 generates the device list of the available devices, the network configuration determining unit 112 performs matching between the device list of the devices used by the application and the device list of the available devices (Step S204). If all the devices used by the application are available as a result of matching between the device lists, the processing of the application can be continued.

Figure 14:
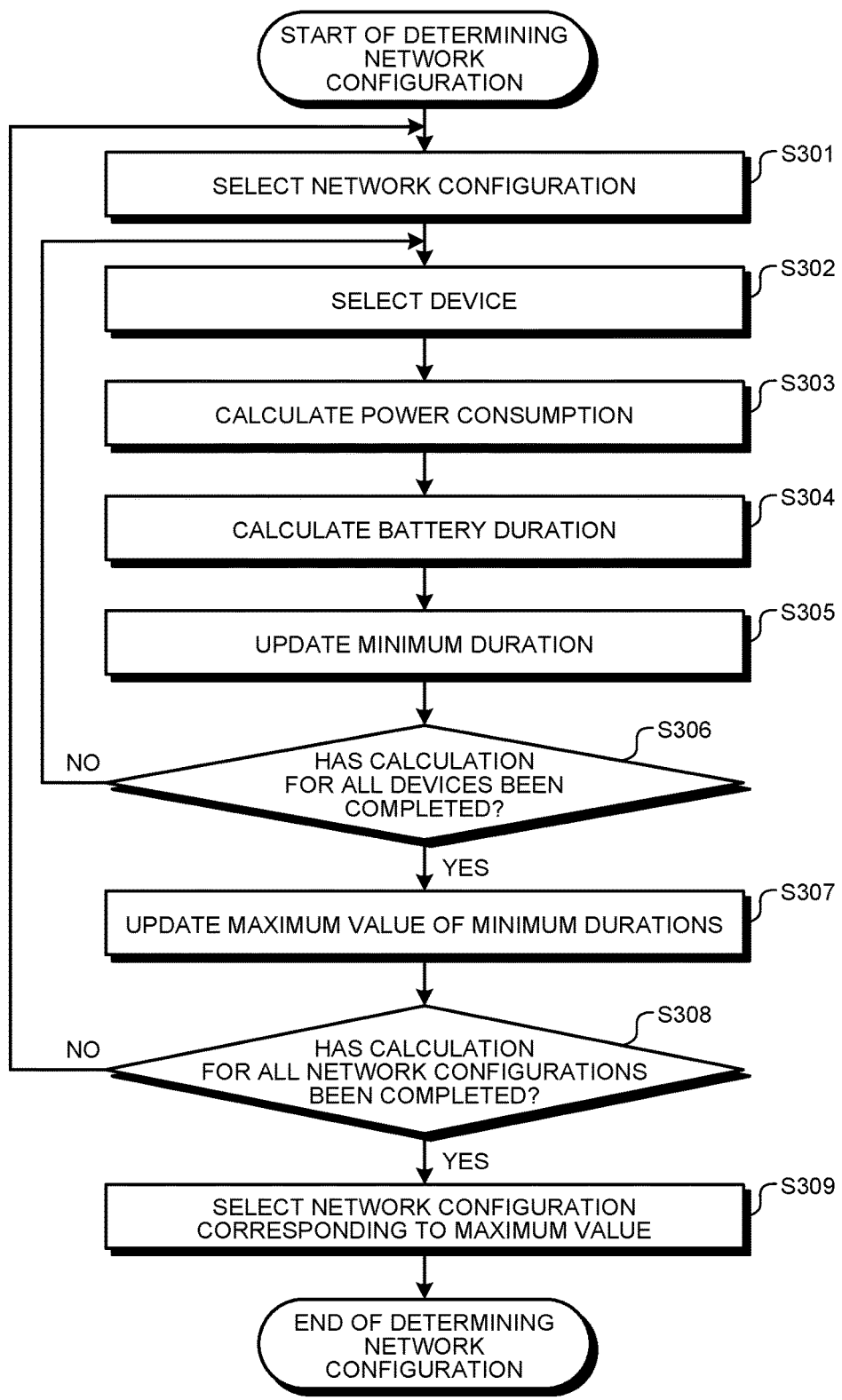
FIG. 14 is a flowchart of network configuration determining processing.

Determination of the network configuration at Step S103 will be explained next using a specific example with reference to a flowchart of FIG. 14. The following network configuration determining processing is performed by the network configuration determining unit 112. In the determination of the network configuration, it is assumed that the network configuration table 141, the route information table 142, the communication frequency table 143, and the power information table 144 are already generated from the result of device searching and are stored in the memory 140.

In the determination of the network configuration, first of all, power consumption according to communication is calculated for each network configuration. Therefore, the power consumption of each device in each of the network configurations stored in the network configuration table 141 is sequentially calculated. In other words, the network configuration table 141 is referred to, one of the network configurations is thereby selected (Step S301), and one of the devices in the selected network configuration is selected (Step S302). The explanation will be continued based on the assumption that the network configuration whose network configuration ID is 1 illustrated in FIG. 4 is selected and the device A is selected.

When the network configuration and the device are selected, the route information table 142, the communication frequency table 143, and the power information table 144 are referred to, and the power consumption that the device in selection consumes due to communication is calculated (Step S303).

Specifically, the power consumption of the device A in selection is calculated by the following Equation (1).

Power consumption=Connection maintenance power+Communication implementation power    (1)

The connection maintenance power is calculated by acquiring all the devices directly connected to the device A in the network configuration in selection from the network configuration table 141, and reading connection maintenance powers for connection with the devices from the power information table 144 to be added to each other. In other words, according to the network configuration table illustrated in FIG. 4, when the network configuration ID is 1, the device A is connected to the device B and the device C, and therefore, respective connection maintenance powers $P_C(A, B)$ and $P_C(A, C)$ illustrated in FIG. 7 are read to be added to each other.

The communication implementation power is calculated by the following Equation (2).

Communication implementation power=Reception power of Device $A$−Transmission power of Device $A$+Power when Device $A$ functions as relay    (2)

The reception power of the device A is calculated in the following manner. In other words, all the communication routes in which the device A is the final destination in the network configuration in selection are acquired from the route information table 142, and each communication traffic in these communication routes is read from the communication frequency table 143. Then in each of the communication routes, a device placed immediately before the device A is specified from the route information table 142, and a product of a reception power when the device A receives the information from the specified device and a communication traffic for each communication route is accumulated. In other words, the reception power of the device A is calculated by the following Equation (3).

Reception power of Device $A = \Sigma\{R(X,A) \times P(_R A, M(X, A, A))\}$    (3)

Where R(X, A) is a communication traffic in a communication route in which a device X other than the device A is a source and the device A is a destination, and is acquired from the communication frequency table 143. Moreover, M(X, A, A) indicates a device placed immediately before the device A in the communication route in which the device X is the source and the device A is the destination.

The transmission power of the device A is calculated in the following manner. In other words, all the communication routes in which the device A is the source in the network configuration in selection are acquired from the route information table 142, and each communication traffic in these communication routes is read from the communication frequency table 143. Then in each of the communication routes, a device placed immediately after the device A is specified from the route information table 142, and a product of a transmission power when the device A transmits the information to the specified device and a communication traffic for each communication route is accumulated. In other words, the transmission power of the device A is calculated by the following Equation (4).

Transmission power of Device $A = \Sigma\{R(A,X) \times P(_T A, N(A,X,A))\}$    (4)

Where R(A, X) is a communication traffic in a communication route in which the device A is a source and a device X other than the device A is a destination, and is acquired from the communication frequency table 143. Moreover, N(A, X, A) indicates a device placed immediately after the device A in the communication route in which the device A is the source and the device X is the destination.

Furthermore, the power when the device A functions as a relay is calculated in the following manner. In other words, all the communication routes in which the device A is not the source nor the destination but is a relay point in the network configuration in selection are acquired from the route information table 142, and each communication traffic in these communication routes is read from the communication frequency table 143. Then in each of the communication routes, a device placed immediately before or immediately after the device A is specified from the route information table 142, and a product of a sum of a reception power and a transmission power between the specified device and the device A and a communication traffic of each communication route is accumulated. In other words, the power when the device A functions as a relay is calculated by the following Equation (5).

$$\text{Power when Device } A \text{ functions as relay} = \Sigma(R(X,Y) \times \{P(_RA, M(X,Y,A)) + P(_TA, N(X,Y,A))\}) \quad (5)$$

Where R(X, Y) is a communication traffic in a communication route in which a device X other than the device A is a source and a device Y other than the device A is a destination, and is acquired from the communication frequency table 143. Moreover, M(X, Y, A) indicates a device placed immediately before the device A in the communication route in which the device X is the source and the device Y is the destination. N(X, Y, A) indicates a device placed immediately after the device A in the communication route in which the device X is the source and the device Y is the destination.

In this way, a power consumption of the device A in the network configuration whose network configuration ID is 1 is calculated. Then a battery duration of the device A is calculated from the calculated power consumption and the remaining battery capacity of the device A reported from the device A at the time of device searching (Step S304). The calculated battery duration is compared with the minimum value of the battery durations calculated up to the current time in the network configuration in selection, and the minimum duration in the network configuration in selection is updated (Step S305). In this case, in the network configuration in selection, because the device A is the initially selected device, the battery duration of the device A is the minimum value.

Then, it is determined whether the power consumptions of all the devices in the network configuration in selection have been calculated (Step S306), and the processing is repeated until the power consumptions of all the devices are calculated. In other words, the power consumptions of the device B and the device C are calculated, and a battery duration of any one of the devices becomes a minimum duration in the network configuration whose network configuration ID is 1.

When the power consumptions of all the devices in the network configuration whose network configuration ID is 1 have been calculated (Yes at Step S306), the minimum duration in this network configuration is compared with the maximum value of the minimum durations in the network configurations calculated up to the current time. The maximum value of the minimum durations is updated based on the result of comparison (Step S307). In this case, because the network configuration whose network configuration ID is 1 is the initially selected network configuration, the minimum duration in this network configuration is the maximum value.

Then, it is determined whether battery minimum durations of the devices related to all the network configurations stored in the network configuration table 141 have been calculated (Step S308), and the processing is repeated until the calculation for all the network configurations is completed. In other words, the battery minimum durations of the network configurations whose network configuration IDs are 2 and 3 have also been calculated, and the minimum duration in any one of the network configurations is stored as the maximum value.

It may be said that the network configuration whose minimum duration becomes the maximum is the optimal network configuration capable of maximizing the operating time of the device network system. Therefore, when each minimum duration related to all the network configurations stored in the network configuration table 141 has been calculated (Yes at Step S308), the network configuration corresponding to the maximum value of the minimum durations is selected as the optimal network configuration (Step S309).

A specific example of selection of the optimal network configuration will be explained below with reference to FIGS. 15 to 17. FIG. 15 is a diagram of a specific example of power consumptions of the devices A to C in the three network configurations. These power consumptions are calculated by the network configuration determining unit 112 that refers to the network configuration table 141, the route information table 142, the communication frequency table 143, and the power information table 144 and uses the Equations (1) to (5).

All of the remaining battery capacities of the devices A to C reported from the devices at the time of device searching are assumed to be 10 mWh herein. In this case, it is possible to calculate a battery duration for each device by dividing the remaining battery capacity by the power consumption of each device. Therefore, the network configuration determining unit 112 calculates a battery duration for each device. The result of the calculations is represented in FIG. 16.

As illustrated in FIG. 16, in the network configuration whose network configuration ID is 1, the battery duration of the device A is 2.16 hours, which is the minimum value. Likewise, in the network configuration whose network configuration ID is 2, the battery duration of the device B is 2.89 hours, which is the minimum value. Moreover, in the network configuration whose network configuration ID is 3, the battery duration of the device B is 2.94 hours, which is the minimum value.

By comparing these minimum durations, it is found that, because the battery duration of the device B in the network configuration whose network configuration ID is 3 is the maximum, setting of this network configuration enables the operating time of the device network system to be maximized. Therefore, the network configuration determining unit 112 determines the network configuration whose network configuration ID is 3 as the optimal network configuration. Then, the routing table according to this network configuration is generated and set in the devices A to C.

As another example, at the time of device searching, it is assumed to receive reports from the devices A and B that the remaining battery capacity is 10 mWh and it is assumed to receive a report from the device C that the remaining battery capacity is 7 mWh. The battery duration of each device in this case is represented in FIG. 17. By comparing FIG. 17 with FIG. 16, it is found that the battery durations of the devices A and B are not changed but the battery duration of the device C is reduced.

As illustrated in FIG. 17, in the network configuration whose network configuration ID is 1, the battery duration of the device A is 2.16 hours, which is the minimum value. Likewise, in the network configuration whose network configuration ID is 2, the battery duration of the device B is 2.89 hours, which is the minimum value. In the network configuration whose network configuration ID is 3, the battery duration of the device C is 2.47 hours, which is the minimum value.

By comparing these minimum durations, it is found that, because the battery duration of the device B in the network configuration whose network configuration ID is 2 is the maximum, setting of this network configuration enables the operating time of the device network system to be maximized. Therefore, the network configuration determining unit 112 determines the network configuration whose network configuration ID is 2 as the optimal network configuration. Then, the routing table according to this network configuration is generated and set in the devices A to C.

As explained above, according to the present embodiment, the power consumption related to communication of each device is calculated for each of the network configurations which differ in the connection relation between devices, and a battery duration is calculated based on the power consumption and the remaining battery capacity. The network configuration whose minimum battery duration is the maximum is selected as an optimal network configuration, and communication settings corresponding to the selected network configuration are performed. Therefore, even when the communication frequency for each application, the communication system between devices, and the like are variously different, the operating time of the device network system can be increased to the maximum.

[b] Second Embodiment

The characteristic of a second embodiment is that a network configuration capable of maximizing the operating time is selected in consideration of power consumption related to processing other than the communication.

The configuration of the device network system according to the second embodiment and the configurations of the mobile terminal device 100, the sensor device 200, and the display device 300 are the same as these of the first embodiment, and therefore, explanation thereof is omitted. In the second embodiment, the content of the power information table 144 stored in the memory 140 of the mobile terminal device 100 is different from that of the first embodiment.

FIG. 18 is a diagram of a specific example of the power information table 144 according to the second embodiment. As illustrated in FIG. 18, the power information table 144 according to the second embodiment stores power consumption due to communication between devices. That is, the power information table 144 stores processing power consumed in processing other than the communication in each device, in addition to the connection maintenance power, the transmission power, and the reception power. In other words, for example, a power consumption $P_P(A)$ consumed, when the device A performs the processing other than the communication, is 10 mW. Likewise, power consumptions $P_P(B)$ and $P_P(C)$ consumed, when the devices B and C perform the processing other than the communication, are 2 mW and 3 mW, respectively.

In the second embodiment, because the power information table 144 stores the processing power, the network configuration determining unit 112 calculates the power consumption of each device using the processing power. Specifically, the network configuration determining unit 112 calculates the power consumption of, for example, the device A using the following Equation (6) instead of the Equation (1).

$$\text{Power consumption} = \text{Processing power} + \text{Connection maintenance power} + \text{Communication implementation power} \quad (6)$$

The processing power is read from the power information table 144. The other connection maintenance power and communication implementation power are calculated using the Equations (2) to (5) similarly to the first embodiment. When the power consumption is calculated by the Equation (6), similarly to the first embodiment, the battery duration for each device is calculated, and the network configuration whose minimum duration becomes the maximum value is selected as an optimal network configuration.

As explained above, according to the present embodiment, the power consumption related to communication and processing of each device is calculated for each of the network configurations which differ in the connection relation between devices, and the battery duration is calculated based on the power consumption and the remaining battery capacity. The network configuration whose minimum battery duration is the maximum is selected as an optimal network configuration, and the communication settings corresponding to the selected network configuration are performed. Therefore, even when the communication frequency for each application, the communication system between devices, and the like are variously different, the operating time of the device network system can be increased to the maximum. Moreover, by calculating the power consumption in consideration of processing specific to each device, the battery duration can be more accurately calculated.

[c] Third Embodiment

The characteristic of a third embodiment is that, when a plurality of devices constituting the device network system are capable of performing the same function, a function allocation to each device is determined in addition to the network configuration.

The configuration of the device network system according to the third embodiment is the same as that of the first embodiment, and therefore, explanation thereof is omitted. In the third embodiment, the configuration of the mobile terminal device 100 is different from that of the first embodiment.

Figure 19:
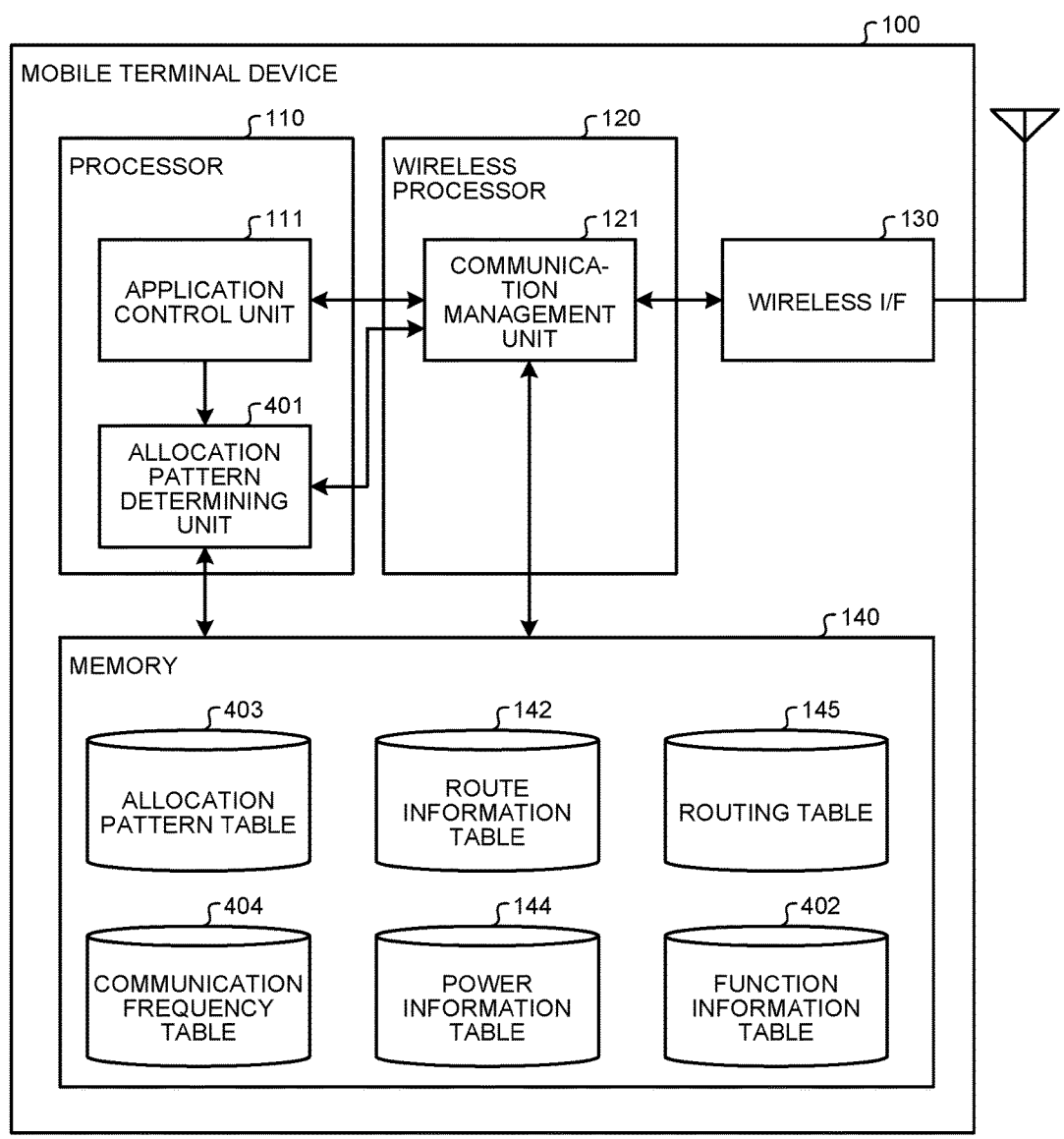
FIG. 19 is a block diagram of a configuration of a mobile terminal device according to a third embodiment.

FIG. 19 is a block diagram of the configuration of the mobile terminal device 100 according to the third embodiment. In FIG. 19, the same reference signs are assigned to the same portions as these of FIG. 2, and explanation thereof is omitted. The mobile terminal device 100 illustrated in FIG. 19 includes an allocation pattern determining unit 401 instead of the network configuration determining unit 112 of the mobile terminal device 100 illustrated in FIG. 2. The memory 140 stores a function information table 402, an allocation pattern table 403, and a communication frequency table 404 in addition to the route information table 142, the power information table 144, and the routing table 145.

When a device list is output from the application control unit 111, the allocation pattern determining unit 401 determines whether wireless communication with all the devices included in the device list is possible. When wireless communication with all the devices included in the device list is possible, the allocation pattern determining unit 401 calculates power consumption due to communication between devices for each allocation pattern that is formed from a combination of a network configuration and a function allocation to each device. The allocation pattern determining unit 401 determines an optimal allocation pattern capable of maximizing the operating time of each device based on the power consumption of each calculated network configuration. The allocation pattern determining unit 401 generates routing information for each device in order to form the network configuration indicated by the determined allocation pattern, and performs communication settings of each device. The allocation pattern determining unit 401 directs the function allocation indicated by the determined allocation pattern to each device.

The function information table 402 stores a function executable by each device associated with processing power when the device executes the function. FIG. 20 is a diagram of a specific example of the function information table 402. As illustrated in FIG. 20, the function information table 402 stores a function or functions executable by each device and stores processing power in order to execute each of the functions. In other words, it is found that, for example, the device B can execute a function X and a function Y and both processing powers for executing these functions are 1 mW. It is also found that both the devices B and C can execute the function Y. As a function executable by a plurality of devices as is the function Y, there is, for example, determination of output for determining whether a result of measurement by a sensor provided in the device B is to be displayed in the device C. In other words, the device B may execute the determination of output and the device C may execute the display, or the device C may execute both the determination of output and the display.

The function information table 402 may be generated based on specification, or the like, of each device in advance to be stored in the memory 140, or may be generated by collecting information from devices at the time of device searching.

The allocation pattern table 403 stores an allocation pattern in which a network configuration and a function allocation to each device are different. That is, the allocation pattern table 403 stores information for a network configuration and a function allocation to each device in association with identification information of an allocation pattern.

Specifically, FIG. 21 represents an example of the allocation pattern table 403 when the network configurations illustrated in FIGS. 3A to 3C are possible. As illustrated in FIG. 21, the allocation pattern table 403 stores a network configuration ID, components in the network configuration, and a function allocation to each device in association with a pattern ID which is identification information of an allocation pattern. In other words, in an allocation pattern whose pattern ID is 1, it is learned that a network configuration in which the device A is directly connected to the device B and to the device C is adopted and that functions X and Y are allocated to the device B and a function Z is allocated to the device C.

The allocation pattern table 403 only has to be generated by the allocation pattern determining unit 401 enumerating a possible connection relation between devices and a function allocation based on the device list capable of wireless communication and the function information table 402.

The communication frequency table 404 stores a communication traffic between devices occurring due to the processing of an application for each function allocation to each device. That is, the communication frequency table 404 stores a source and a destination of information transmitted and received between devices and its communication traffic according to the processing of an application executed by the application control unit 111 and the function allocation to each device.

Specifically, FIG. 22 represents an example of the communication frequency table 404 when the network configurations illustrated in FIGS. 3A to 3C are possible. As illustrated in FIG. 22, the communication frequency table 404 stores a communication traffic per unit time for each function allocation associated with a source and a destination of communication generated according to the processing of the application. In other words, for example, when the functions X and Y are allocated to the device B and the function Z is allocated to the device C, it is found that communication of 100 bytes per second will occur from the device A to the device B. Because the source of the communication frequency table 404 is a source as a start point of the communication and the destination is a destination as an end point of the communication, the communication traffic stored in the communication frequency table 404 does not include a communication traffic when each of the devices functions as a relay point for relaying the information.

The communication frequency table 404 only has to be generated from a communication traffic for each function allocation obtained by the allocation pattern determining unit 401 acquiring the communication traffic between devices, from the allocation pattern determining unit 401, which is assumed based on the processing of an application and the function allocation to each device.

The allocation pattern determining unit 401 refers to the function information table 402, the allocation pattern table 403, the route information table 142, the communication frequency table 404, and the power information table 144, to calculate power consumption due to the communication for each allocation pattern. The allocation pattern determining unit 401 also calculates a battery duration of each device for each allocation pattern from the remaining battery capacities of the mobile terminal device 100, the sensor device 200, and the display device 300 and from the calculated power consumptions. Furthermore, the allocation pattern determining unit 401 compares minimum values of the battery durations of the devices in the allocation patterns, and determines an allocation pattern whose minimum value is the maximum as an optimal allocation pattern. The allocation pattern determining unit 401 then generates the routing table 145 of the mobile terminal device 100 and the respective routing tables of the sensor device 200 and the display device 300 in order to form a network configuration in the optimal allocation pattern. The allocation pattern determining unit 401 directs the function allocation in the optimal allocation pattern to the sensor device 200 and the display device 300.

Figure 23:
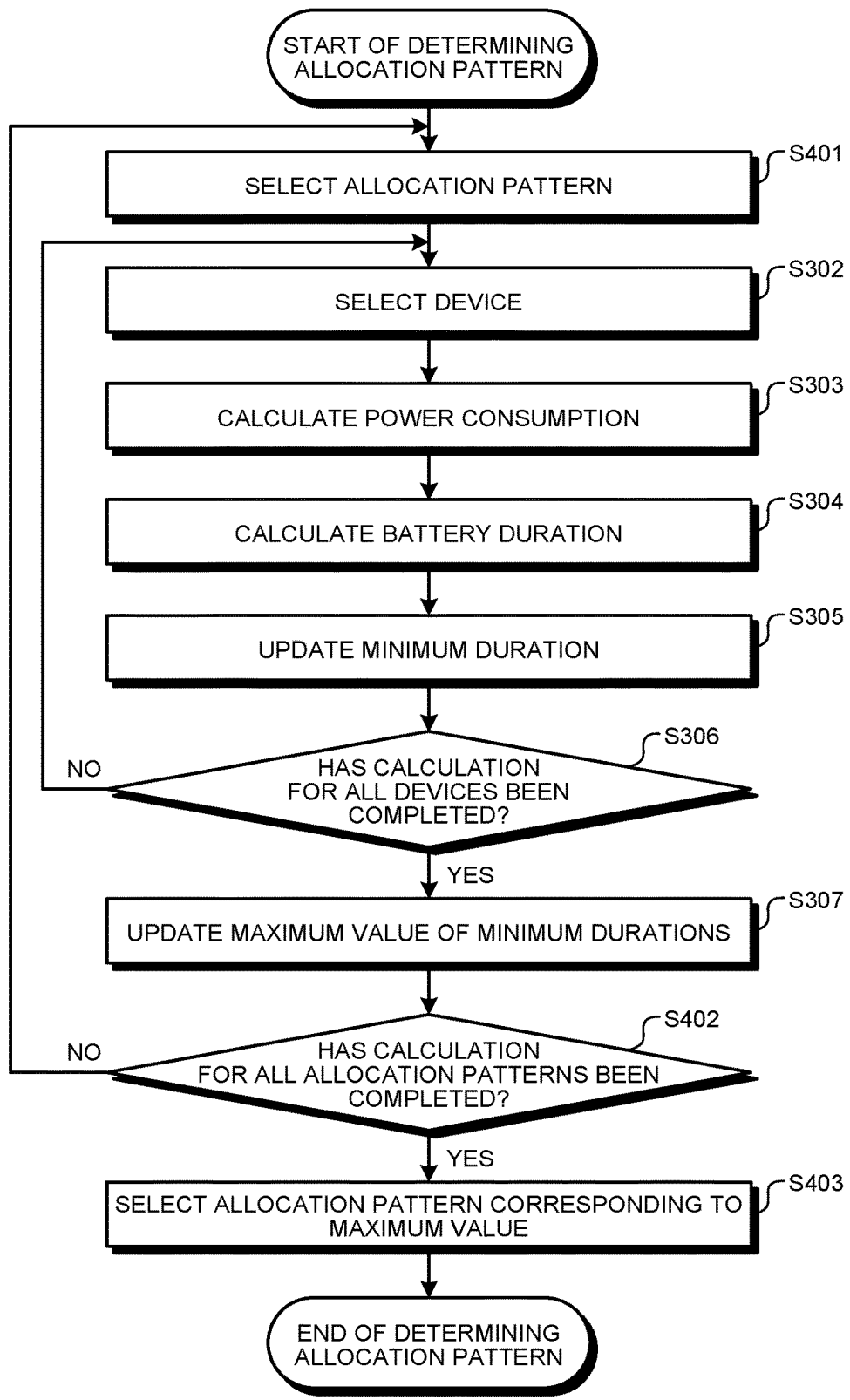
FIG. 23 is a flowchart of allocation pattern determining processing.

Determination of an allocation pattern according to the third embodiment will be explained below with reference to a flowchart illustrated in FIG. 23. The allocation pattern determining processing is performed instead of the network configuration determining processing illustrated in FIG. 14. Therefore, in FIG. 23, the same reference signs are assigned to the same portions as these of FIG. 14, and detailed explanation thereof is omitted.

In the determination of the allocation pattern, first of all, power consumption related to communication is calculated for each allocation pattern. Therefore, the power consumption of each device in each allocation pattern stored in the allocation pattern table 403 is sequentially calculated. In other words, the allocation pattern table 403 is referred to, one of the allocation patterns is thereby selected (Step S401), and one of the devices in this allocation pattern is selected (Step S302).

When the allocation pattern and the device are selected, the route information table 142, the communication frequency table 404, and the power information table 144 are referred to, and the power consumption that the device in selection consumes due to communication is calculated by the Equation (1) (Step S303).

Then, a battery duration of the device in selection is calculated from the calculated power consumption and the remaining battery capacity of the device reported at the time of device searching (Step S304). The calculated battery duration is compared with the minimum value of the battery durations calculated up to the current time in the allocation pattern in selection, and the minimum duration in the allocation pattern in selection is updated (Step S305).

It is then determined whether the power consumptions of all the devices in the allocation pattern in selection have been calculated (Step S306), and the processing is repeated until the power consumptions of all the devices are calculated.

When the power consumptions of all the devices in the allocation pattern in selection have been calculated (Yes at Step S306), the minimum duration in this allocation pattern is compared with the maximum value of the minimum durations in the allocation patterns calculated up to the current time. The maximum value of the minimum durations is updated based on the result of comparison (Step S307).

Then, it is determined whether battery minimum durations of the devices related to all the allocation patterns stored in the allocation pattern table 403 have been calculated (Step S402), and the processing is repeated until the calculation for all the allocation patterns is completed.

It may be said that the allocation pattern whose minimum duration becomes the maximum is the optimal allocation pattern capable of maximizing the operating time of the device network system. Therefore, when each minimum duration related to all the allocation patterns stored in the allocation pattern table 403 has been calculated (Yes at Step S402), the allocation pattern corresponding to the maximum value of the minimum duration is selected as the optimal allocation pattern (Step S403).

When the optimal allocation pattern is selected, the routing table according to the network configuration corresponding to this allocation pattern is generated and is set in the devices, and the function allocation corresponding to the selected allocation pattern is directed to the devices.

As explained above, according to the present embodiment, the power consumption related to communication of each device is calculated for each of the allocation patterns which differ in the connection relation between devices and differ in the function allocation to each device, and the battery duration is calculated based on the power consumption and the remaining battery capacity. An allocation pattern whose minimum battery duration becomes the maximum is selected as an optimal allocation pattern, and the communication settings and the function allocation corresponding to the selected allocation pattern are performed. Therefore, when a plurality of devices constituting the device network system can execute the same function, the operating time of the device network system can be increased to the maximum.

The embodiments can be implemented appropriately in combinations. In other words, it is possible to combine, for example, the second embodiment and the third embodiment, to calculate power that each device consumes for communication and processing other than the communication in each allocation pattern, and to calculate a battery duration based on the calculated power consumption.

When the second embodiment and the third embodiment are to be combined, because the processing power of each device is different due to the function allocation, the processing power of each device only has to be calculated for each function allocation. In other words, when the processing power for each function of the devices is, for example, the processing power of the function information table 402 illustrated in FIG. 20, by allocating the functions X and Y to the device B and by allocating the function Z to the device C, the processing power of the device B becomes 2 (=1+1) mW, and the processing power of the device C becomes 2 mW. On the other hand, if the function X is allocated to the device B and the functions Y and Z are allocated to the device C, the processing power of the device B becomes 1 mW, and the processing power of the device C becomes 2.5 (=2+0.5) mW.

In the embodiments, different network configurations are assumed to differ in the connection relation between directly connected devices. However, the network configuration is not limited to those defined by directly connected devices. In other words, for example, when devices are connected in a different communication system, even if the devices in the same combination are directly connected to each other, the devices may be configured as a different network configuration. Specifically, for example, a network configuration in which the device A and the device B are connected by Bluetooth® and a network configuration in which the device A and the device B are connected by infrared communication may be handled as a different network configuration.

Moreover, the device network setting processing explained in the embodiments is also capable of being described as a computer-executable program. In this case, it is also possible to store the program in a computer-readable recording medium and introduce it in the computer. The computer-readable recording medium includes a portable recording medium such as compact disk read only memory (CD-ROM), digital versatile disk (DVD), and Universal Serial Bus (USB) memory, and a semiconductor memory such as a flash memory.

According to one aspect of the mobile terminal device and the method for network setting of devices disclosed in the present application, it is possible to make sufficiently long the operating time of the device network system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A mobile terminal device comprising:
a wireless communication unit that performs wireless communication with another battery-operated device; and
a processor connected to the wireless communication unit, wherein the processor executes a process comprising:
calculating power consumption for each of network configurations that differ in a connection relation between a plurality of devices including the mobile terminal device and the another device, the power consumption consumed by the devices for wireless communication, determining a network configuration having a longest battery duration of the devices, based on the calculated power consumption, and setting a connection between the devices according to the determined network configuration, wherein the calculating includes calculating power consumption of each of the devices for each network configuration, based on a communication traffic between the devices according to an application, power for maintaining a connection between the devices, power consumed by the devices upon transmission, and power consumed by the devices upon reception.

2. The mobile terminal device according to claim 1, wherein the calculating includes calculating power consumption consumed by the devices for the wireless communication and for processing specific to each of the devices other than the wireless communication.

3. The mobile terminal device according to claim 1, wherein the calculating includes calculating power consumption consumed by the devices for wireless communication for each of allocation patterns which differ in a combination of the network configuration and a function allocation to each of the devices, the determining includes determining an allocation pattern having a longest battery duration of the devices, based on the calculated power consumption, and the setting includes setting a connection between the devices and a function executed by each of the devices according to the determined allocation pattern.

4. The mobile terminal device according to claim 1, wherein the determining includes acquiring a remaining battery capacity of each of the devices, and calculating a battery duration of each of the devices from the acquired remaining battery capacity and the calculated power consumption.

5. The mobile terminal device according to claim 1, wherein the determining includes comparing minimum battery durations in network configurations, and selecting a network configuration corresponding to a maximum value of the minimum battery durations.

6. A method for device network setting, the method comprising:

calculating, by a processor, power consumption for each of network configurations that differ in a connection relation between a plurality of battery-operated devices, the power consumption consumed by the devices for wireless communication;

determining, by the processor, a network configuration having a longest battery duration of the devices, based on the calculated power consumption, and setting, by the processor, a connection between the devices according to the determined network configuration, wherein the calculating includes calculating power consumption of each of the devices for each network configuration, based on a communication traffic between the devices according to an application, power for maintaining a connection between the devices, power consumed by the devices upon transmission, and power consumed by the devices upon reception.

7. A non-transitory computer-readable recording medium having stored therein a program that causes a computer to execute a process comprising:

calculating power consumption for each of network configurations that differ in a connection relation between a plurality of battery-operated devices, the power consumption consumed by the devices for wireless communication;

determining a network configuration having a longest battery duration of the devices, based on the calculated power consumption, and setting a connection between the devices according to the determined network configuration, wherein the calculating includes calculating power consumption of each of the devices for each network configuration, based on a communication traffic between the devices according to an application, power for maintaining a connection between the devices, power consumed by the devices upon transmission, and power consumed by the devices upon reception.

* * * * *